2,734,906

ETHYLENE OXIDE PRODUCTION

Leland J. Beckham, Bermuda District, Va., assignor to Allied Chemical & Dye Corporation, New York, N. Y., a corporation of New York No Drawing. Application November 5, 1951,
Serial No. 254,980

5 Claims. (Cl. 260—348.5)

This invention relates to the production of ethylene oxide by the direct catalytic oxidation of ethylene with oxygen and more particularly refers to a new and improved method of controlling the oxidation of ethylene by the use of inhibitors.

The oxidation of ethylene to ethylene oxide by the direct oxidation process is generally carried out by passing a mixture of ethylene in an air or oxygen-containing gas through tubes containing a supported silver catalyst maintained at a temperature between about 200° and 350° C. A liquid bath of molten salt or high boiling organic liquid surrounds the catalyst tube for heat control. The effluent gases, containing nitrogen, oxygen, unreacted ethylene, carbon dioxide, water vapor and ethylene oxide, are passed into a separating system, usually a water scrubber, where the ethylene oxide is removed. The unreacted ethylene with the other unabsorbed gases is recycled through the reactor and make-up oxygen as air and ethylene is added to restore the desired concentration. A portion of the effluent gases is bled from the system to maintain the balance. The process may be operated at atmospheric, subatmospheric or superatmospheric pressure.

In the conversion of ethylene and oxygen to ethylene oxide over extended periods of time, low yields of the desired product are obtained due to the impairment of the ability of the catalyst to promote conversion of the ethylene and to the production of substantial quantities of undesired by-products which primarily are carbon dioxide and water resulting from the complete oxidation of ethylene. A major factor contributing to the promotion of side reactions is the variable temperature in the catalyst zone resulting from the exothermic reaction of the reactant gases developing a temperature gradient in the catalyst bed with localized hot spots therein.

An object of the present invention is to provide an efficient process for catalytically oxidizing ethylene directly with oxygen into ethylene oxide.

A further object of this invention is to provide a process for continuously producing from ethylene and oxygen over extended periods of time high yields of ethylene oxide.

Another object of this invention is to provide an improved method of regulating temperature conditions in the catalyst zone of a process for converting ethylene and oxygen into ethylene oxide. Further objects and advantages will be apparent from the following description.

I have found that the catalytic oxidation of ethylene with oxygen to produce ethylene oxide may be controlled to maintain high "ethylene attack" and high "ethylene oxide efficiency" by the addition of halogen containing compounds boiling within the range of 375° C. to about 525° C. (760 mm. Hg) in an amount of less than 10 parts per million, preferably less than 1 part per million, of the gas mixture undergoing reaction in the catalyst zone. The term "ethylene attack" as used herein shall mean the percent ethylene per pass through the catalyst bed converted, i. e. transformed into products other than ethylene such as the desired product ethylene oxide and by-products such as carbon dioxide, formic acid, etc. The term "ethylene oxide efficiency" as used herein shall mean the percent ethylene attacked converted into the desired product, ethylene oxide. Examples of the inhibitors to be employed in accordance with the present invention are dichlorodiphenyltrichloroethane, hexabromobenzene, pentabromophenol, 1,2,2,2-tetrachloro - 1,1 - bis ethane, 9,10 - dibromoanthracene, 3,4,5,6-tetrabrom - 1,2 - xylene, 2,3,5,6-tetrachlor-1,4-dichloromethylbenzene, 2,4,6-tribrombenzophenone, 2,4'-dibrombenzophenone, chlorinated biphenyl, chlorinated polyphenyls, chlorinated petroleum fractions such as heavy naphtha and kerosene, and mixtures thereof. My preferred inhibitors are the chlorine substituted cyclic hydrocarbons containing from about 50 to 70% chlorine and boiling within the range of 385° to 460° C. because these inhibitors were found to have desirable properties with respect to their vapor pressure and stability and, furthermore, are readily available and low in cost.

While I do not wish to predicate my invention on any theory of the mechanism of the reaction, the following equations and explanation may aid in a better understanding of the present invention.

In the direct oxidation of ethylene with oxygen in the presence of a catalyst to promote the production of ethylene oxide two main reactions occur:

(1) $C_2H_4 + \tfrac{1}{2}O_2 = C_2H_4O \ \Delta H_{548°K} = -46,000$ cal.

(2) $C_2H_4 + 3O_2 = 2CO_2 + 2H_2O \ \Delta H_{548°K} = -330,000$ cal.

A high ethylene oxide efficiency in the process is dependent on the extent to which the first reaction can be encouraged and the second reaction can be repressed. Since the second reaction generates about 7 times as much heat as the first and high temperatures encourage the complete oxidation of the ethylene the extent and efficiency of the overall reaction must be carefully controlled to prevent runaway temperatures, hot spots and low efficiency. The conventional method of controlling the rate of reaction in the catalyst zone by regulating the temperature of the bath surrounding the catalyst tubes has been found inadequate in that—(a) dropping the temperature of the surrounding bath is only partially effective in reducing the temperature gradient and hot spots in the catalyst bed, and (b) reducing the temperature of the surrounding bath to minimize temperature gradient and hot spots in the catalyst bed results in an overall lowering of the temperature in the catalyst bed with consequent reduced ethylene attack and impractical operation. Also as appreciated by those skilled in the art, it is difficult, if not impossible, because of the requirement of transferring heat from the catalyst through the walls of the catalyst tube to the surrounding bath, to maintain close control of the temperature throughout the catalyst bed by changing the temperature in the bath surrounding the catalyst tubes.

I have found that the addition of inhibitor disclosed herein in an amount of less than 10 parts per million, preferably less than 1 part per million, to the gases entering the catalyst zone has the effect of stabilizing the catalytic reaction and increasing the ethylene oxide efficiency, i. e. favoring the reaction of ethylene oxide and depressing the reaction of ethylene to carbon dioxide and water. Although the addition of inhibitor has an overall depressing influence on the entire catalyst bed, surprisingly the inhibitor appears to preferentially and materially reduce the activity of the catalyst at its high temperature points, hot spots, resulting in a catalyst bed of much more uniform temperature. Of course, the general temperature in the catalyst bed will be maintained by the baths surrounding the catalyst tubes. The addition of inhibitor permits a dual control on the extent of oxidation of the ethylene which may be maintained to produce a desired ethylene attack at a given ethylene oxide efficiency.

Maintenance of optimum ethylene attack and ethylene oxide efficiency are of particular importance in a recycle process under high superatmospheric pressure. Operation of the catalytic direct oxidation process to produce ethylene oxide at elevated pressures (150 p. s. i. or above) aids in the recovery of the ethylene oxide product and permits use of smaller size equipment and amount of catalyst required. Under such high pressure operation it is necessary to limit the amount of ethylene attacked because of difficulty involved in removal of the heat generated due to the exothermic reaction of ethylene and oxygen. For economy, the unattacked ethylene must be recirculated. Oxygen concentrations in inlet gases are kept below 8% and preferably at 3–6% to minimize explosive hazards. Optimum inlet ethylene concentrations are about 4 to 5%. Under these conditions it is desirable to maintain the activity of the catalyst to give about 30–40% ethylene attack and about 60–75% ethylene oxide efficiency. This may be accomplished by the use of low concentrations of inhibitor, i. e. the addition of inhibitor in an amount below 10 parts per million and preferably one part per million or below. It is important to maintain the addition of inhibitor to the gases entering the catalyst zone below 10 parts per million as any substantial increase in amount above 10 parts per million causes poisoning of the catalyst with drop in ethylene attack. The use of minute amounts of inhibitor as contemplated in the present invention has the advantages of avoiding contamination of the ethylene oxide product and not materially affecting the cost of operation.

The operation of the process for the catalytic conversion of ethylene to ethylene oxide may be carried out in any suitable apparatus conventional in the art. For purpose of illustration, one method of operation will be described. To recycle gas of the system consisting primarily of nitrogen, carbon dioxide and ethylene is added ethylene feed and make-up air so as to bring up the concentration of ethylene in the gas to 2–5% and the concentration of oxygen in the gas to about 3–6% by volume. The total gas is compressed to a pressure of about 150 pounds, preheated to a temperature of about 200–240° C. and then fed to a reactor of the shell and tube type with the catalyst inside the tubes and a cooling medium, such as molten salt, or organic liquid, such as diphenyl, on the outside to control the temperature. The catalyst in the reactor tubes consists of a suitable inert material such as crushed Alundum or particles of aluminum silicate coated with silver oxide catalyst and, if desired, promoted with an alkali or alkaline metal compound such as calcium or barium. The temperature of the catalyst is maintained between about 225–275° C. The effluent gases from the reactor are then passed in indirect heat exchange with the gases entering the reactor thereby preheating the inlet gases and cooling the exit gases and the cooled gases introduced into a scrubber which may be any tower suitable for that purpose, as for example a bubble-cap tower. Water is fed into the top of the scrubber flowing down the column, dissolving the water-soluble constituents (ethylene oxide) from the reaction products. Unabsorbed gases from the top of the scrubber are recycled to the reactor, first bleeding off a small portion of the gases for the purpose of relieving the system of inert nitrogen. The hot aqueous solution from the base of the scrubber is cooled, and recirculated to the top of the scrubber for further scrubbing of the effluent gases from the reactor. A portion of the cooled aqueous solution from the base of the scrubber is withdrawn and subjected to fractionation for removal of ethylene oxide. Prior to introduction of the gases into the reactor a small amount of inhibitor, less than 10 parts per million, preferably less than 1 part per million, is added to the mixture of gases containing the reactants. This may be accomplished by several means. The inhibitor may be placed in a small vessel and all of a portion of the make-up air passed in contact with the inhibitor, the air carrying with it a small amount of inhibitor due to vaporization or entrainment. The air containing small amounts of inhibitor is then commingled with the recycle gases and feed ethylene prior to entering the reactor. Alternatively, recycle gas may be passed through the inhibitor vessel for the purpose of carrying small portions of inhibitor into the total gases entering the reactor. The amount of inhibitor introduced into the system is a function of the temperature and the amount of gas passing in contact with the body of inhibitor. The temperature of the inhibitor may be regulated by surrounding the vessel containing the inhibitor with a heating jacket or preheating the gas prior to its passage in contact with the inhibitor. The volume of air or gas flowing through the inhibitor chamber may, of course, easily be regulated. A number of inhibitors, particularly the chlorinated polyphenyls, are of a thermoplastic nature. Glass beads, crushed Alundum or similar inert materials may be coated with these plastic inhibitors and the coated material placed in a column through which the air or gas passes thereby assuring good contact between the inhibitor and the carrier gas. It has been found unnecessary to heat the inhibitor to a temperature in excess of 100° C. in order to introduce into the ethylene oxide system inhibitor in an amount of less than 10 parts per million based on total gases entering the reactor. In practice the control of the amount of inhibitor introduced into the system was found to be accomplished with ease due to the low vapor pressure of the high boiling halogenated compounds which did not vary widely over an appreciable range of temperature and which could readily be regulated by controlling the temperature and amount of gas passing in contact with the inhibitor. Merely by way of illustration, dichlorodiphenyltrichloroethane has a vapor pressure in mm. Hg at 40° C. of $3.2 \times 10^{-6}$; at 60° C.—$6 \times 10^{-5}$; at 100° C.—$4.8 \times 10^{-3}$. A mixture of chlorinated polyphenyls having a distillation range of 435–450° C. has a vapor pressure, mm. Hg at 40° C. of $1 \times 10^{-4}$; at 60° C.—$6.5 \times 10^{-3}$; at 100° C.—$1.1 \times 10^{-2}$. Thus, even through minor fluctuations in temperature and volume of carrier gas occur as is common in practical operation the amount of inhibitor introduced into the system would remain well within the limits of 10 parts per million or less thereby minimizing the possibility of poisoning the catalyst by addition of too much inhibitor.

The following examples illustrate the invention:

*Example 1*

A reactor consisting of 1″ stainless steel pipe jacketed to contain a diphenyl bath heated by electrical windings on the outside of the jacket is charged with ⅜″ porous aluminum silicate support material coated with silver oxide and promoted with a barium compound. The catalyst is first heated by elevating the temperature of the diphenyl bath to about 260° C. and maintained at that temperature. A gas mixture containing 89% $N_2$, 6% $O_2$ and 5% $C_2H_4$ is first preheated to a temperature of 210° C. and then introduced into the reactor in contact with the catalyst. No inhibitor during the initial stages of operation is added to the reactants. Hot spots and a temperature gradient gradually develop in the catalyst bed with the temperature of catalyst ranging from 257° C. at the top of the bed to 350° C. at the highest point. Under these conditions 39% of the ethylene is attacked at an ethylene oxide efficiency of 37.3%. Thereupon, 89% of the total gases at a pressure of 800 mm. prior to entrance into the reactor are passed through a glass column packed with 2–4 mesh tabular alumina coated with powdered dichlorodiphenyltrichloroethane maintained at about 85° C. to provide inhibitor in an amount of 0.80 part per million based on the total gases entering the reactor. In a period of several hours the hot spot temperature of the catalyst drops to 265° C. and substantially uniform temperatures exist in the catalyst bed. The ethylene attack after addition of inhibitor is within the range of 35–40% and the ethylene oxide efficiency increased to 65–70%.

In order to show the detrimental effect of adding too much inhibitor, 30 parts per million inhibitor is introduced into the reactant gases. After several hours operation the ethylene attack drops to about 16%.

*Example 2*

Using the same catalyst and apparatus described in Example 1, and with operating conditions of gas composition and bath temperature the same as Example 1, the following results are obtained with and without the addition of inhibitor, $C_6Br_6$, to the reactant gases. In the absence of inhibitor, 40% ethylene attack and 42% ethylene oxide efficiency are obtained with a catalyst hot spot of 320° C. Upon the addition of 0.9 part per million hexabromobenzene as inhibitor to the gas mixture entering the reactor the ethylene attack is 38.5% and the ethylene oxide efficiency is increased to 72.7%.

*Example 3*

Again using the same catalyst, apparatus and operating conditions, gas composition and bath temperature, as described in Example 1, except that chlorinated polyphenyl having a distillation range of 435–450° C. is employed as the inhibitor, the following results are obtained. In the absence of inhibitor the ethylene attack is 37% with an ethylene oxide efficiency of 40% and catalyst hot spot temperature of 335° C. After continued addition of 0.3 part per million inhibitor to the reactant gases the ethylene attack is 36%, the ethylene oxide efficiency is 72% and the hot spot drops to 268° C.

Although certain preferred embodiments of the invention have been disclosed for purpose of illustration, it will be evident that various changes and modifications may be made therein without departing from the scope and spirit of the invention.

I claim:

1. In a process for producing ethylene oxide involving passing a gas mixture containing ethylene and oxygen in contact with a silver catalyst to promote the reaction between ethylene and oxygen to produce ethylene oxide, the improvement which comprises adding to the gas mixture containing reactants a chlorinated polyphenyl compound boiling within the range of 435° C. to 450° C. in an amount of less than 10 parts per million of the gas mixture.

2. In a process for the production of ethylene oxide which comprises passing a gas mixture containing ethylene and oxygen in contact with a silver catalyst at an elevated temperature to produce ethylene oxide, the improvement which comprises adding to the gas mixture containing reactants a chlorinated polyphenyl compound having a boiling point of approximately 450° C. in an amount of about 1 part per million of the gas mixture.

3. In a process for the production of ethylene oxide which comprises passing a gas mixture containing ethylene and oxygen in contact with a silver catalyst at an elevated temperature to produce ethylene oxide, the improvement which comprises adding to the gas mixture containing reactants a chlorinated polyphenyl compound having a boiling point of within the range of 435° C. to 450° C. in an amount not exceeding about 1 part per million of the gas mixture.

4. In a process for producing ethylene oxide involving passing a gas mixture containing ethylene and oxygen in contact with a silver catalyst to promote the reaction between ethylene and oxygen to produce ethylene oxide, the improvement which comprises adding to the gas mixture containing reactants 2,4,6-tribromobenzophenone in an amount of less than 10 parts per million of the gas mixture.

5. In a process for producing ethylene oxide involving passing a gas mixture containing ethylene and oxygen in contact with a silver catalyst to promote the reaction between ethylene and oxygen to produce ethylene oxide, the improvement which comprises adding to the gas mixture containing reactants hexabromobenzene in an amount of less than 10 parts per million of the gas mixture.

References Cited in the file of this patent

UNITED STATES PATENTS

| | | |
|---|---|---|
| 2,194,602 | Law | Mar. 26, 1940 |
| 2,219,575 | McNamee | Oct. 29, 1940 |
| 2,270,780 | Berl | Jan. 20, 1942 |
| 2,279,469 | Law | Apr. 14, 1942 |
| 2,279,470 | Law | Apr. 14, 1942 |

OTHER REFERENCES

McKim: Canadian J. of Research, vol. 27, sec. B, Nov. 1949, No. 11, pp. 813–827.